(12) United States Patent
Almaguer

(10) Patent No.: US 7,291,083 B2
(45) Date of Patent: Nov. 6, 2007

(54) INTER-AXLE DIFFERENTIAL ASSEMBLY

(75) Inventor: Adalberto Jair Reyes Almaguer, Hendersonville, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 210 days.

(21) Appl. No.: 10/911,011

(22) Filed: Aug. 4, 2004

(65) Prior Publication Data

US 2006/0030448 A1    Feb. 9, 2006

(51) Int. Cl.
*F16H 48/06* (2006.01)

(52) U.S. Cl. .................. 475/221; 475/198; 475/200; 475/201; 475/231; 475/243; 180/249

(58) Field of Classification Search ............... 475/230, 475/231, 198, 200, 201, 221, 222, 243; 180/248, 180/249, 250
See application file for complete search history.

(56) References Cited

U.S. PATENT DOCUMENTS 3,388,760 A * 6/1968 Christie ................ 180/24.09
4,050,328 A * 9/1977 Romick ................. 475/221
4,304,317 A * 12/1981 Vanzant et al. ......... 180/247
4,381,828 A * 5/1983 Lunn et al. ............. 180/247
5,718,653 A * 2/1998 Showalter .............. 475/230
6,001,043 A * 12/1999 Yun ...................... 475/221

* cited by examiner

*Primary Examiner*—David D. Le
(74) *Attorney, Agent, or Firm*—Carlson, Gaskey & Olds

(57) ABSTRACT

An inter-axle differential assembly includes a forward side gear and a rear side gear that are supported by an input shaft. The forward and rear side gears are in meshing engagement with a plurality of inter-axle differential pinion gears that are supported on a spider. The spider is driven by the input shaft and has a plurality of legs with each leg supporting one of the plurality of inter-axle differential pinion gears. A helical drive gear is fixed for rotation with the forward side gear. The helical drive gear includes a center cavity defined by a spherical inner surface. The spider and the plurality of inter-axle differential pinion gears are positioned within the center cavity. This eliminates the need for an inter-axle differential housing assembly and reduces standout.

20 Claims, 5 Drawing Sheets

INTER-AXLE DIFFERENTIAL ASSEMBLY

TECHNICAL FIELD

The subject invention relates to an inter-axle differential assembly including a forward side gear mounted for rotation with a helical drive gear and including a plurality of inter-axle differential pinion gears positioned in a spherical center cavity formed in the helical drive gear.

BACKGROUND OF THE INVENTION

A tandem drive axle is typically used to drive rear wheels on a heavy-duty commercial vehicle, such as a tractor-trailer vehicle, for example. The tandem drive axle includes a forward drive axle and a rear drive axle that are connected by an interconnecting driveshaft. The tandem drive axle includes an inter-axle differential assembly that allows speed differentiation between the forward drive axle and the rear drive axle. The inter-axle differential assembly provides speed differentiation between driving input to a forward differential gear assembly for the forward drive axle and driving input to a rear differential gear assembly for the rear drive axle as needed.

A typical inter-axle differential assembly includes a rear side gear, a plurality of inter-axle differential pinion gears supported on a spider, a forward side gear, and an inter-axle differential housing assembly. An input shaft drives the spider. The forward and rear side gears are in meshing engagement with the plurality of inter-axle differential pinion gears. The forward side gear is coupled to drive a helical gear that drives the forward differential gear assembly. The spider and the plurality of inter-axle differential pinion gears are enclosed within the inter-axle differential housing assembly.

The forward drive axle includes an axle housing that includes a center bowl portion that receives the inter-axle differential assembly and the forward differential gear assembly. The forward differential gear assembly is enclosed within a gear housing to form a carrier assembly. The inter-axle differential housing assembly is positioned within the carrier assembly and the carrier assembly is bolted to the axle housing. An input yoke couples a vehicle driveshaft to the input shaft of the inter-axle differential assembly to provide driving input into the forward drive axle.

This configuration has some disadvantages. One disadvantage is that the inter-axle differential housing assembly significantly increases the weight of the inter-axle differential assembly. This adversely affects fuel economy. Further, the need for the inter-axle differential housing itself increases overall component cost and assembly time.

Another disadvantage is that this configuration can have a relatively large standout dimension. Standout is defined as a distance from a machined surface of the axle housing, adjacent the center bowl portion, to an end of the input yoke. Standout adversely affects driveline angles. The greater the standout, the greater the driveline angle. Greater driveline angles can adversely affect component wear.

It would be beneficial to provide an inter-axle differential assembly that eliminates the inter-axle differential housing assembly and reduces standout. The inter-axle differential assembly should be lightweight and easy to assemble, as well as overcoming any other above-mentioned deficiencies in the prior art.

SUMMARY OF THE INVENTION

An inter-axle differential assembly includes a forward side gear, a rear side gear, a differential spider, and a plurality of inter-axle differential pinion gears that are in meshing engagement with the forward and rear side gears. An input shaft drives the differential spider, which drives the plurality of inter-axle differential pinion gears and the forward side gear. The forward side gear is mounted for rotation with a drive gear that provides driving input to a forward axle differential assembly. The drive gear includes a center cavity that receives the plurality of inter-axle differential pinion gears.

In one example, the drive gear is a helical drive gear having an outer circumferential surface and an inner circumferential surface. A first plurality of gear teeth is formed about the outer circumferential surface. The first plurality of gear teeth are in meshing engagement with a second plurality of gear teeth formed on a helical driven gear. The inner circumferential surface defines the center cavity of the helical drive gear. The inner circumferential surface is defined by a spherical radius.

The differential spider supports the plurality of inter-axle differential pinion gears. The differential spider includes a plurality of legs where each leg supports one of the plurality of inter-axle differential pinion gears. The differential spider and the plurality of inter-axle differential pinion gears are substantially enclosed within the center cavity of the helical drive gear.

In one example, the forward side gear is joined to one side of the helical drive gear. The forward side gear includes an outer circumferential flange with a plurality of openings. These openings align with extensions formed on a circumferential flange of the helical drive gear. The extensions are received within the openings to fix the forward side gear and helical drive gear together.

The subject inter-axle differential assembly provides a compact design that eliminates the need for an inter-axle differential housing assembly and reduces standout. The inter-axle differential assembly also is more lightweight and easier to assemble than prior designs. These and other features of the present invention can be best understood from the following specification and drawings, the following of which is a brief description.

DETAILED DESCRIPTION OF THE PREFERRED EMBODIMENT

Figure 1:
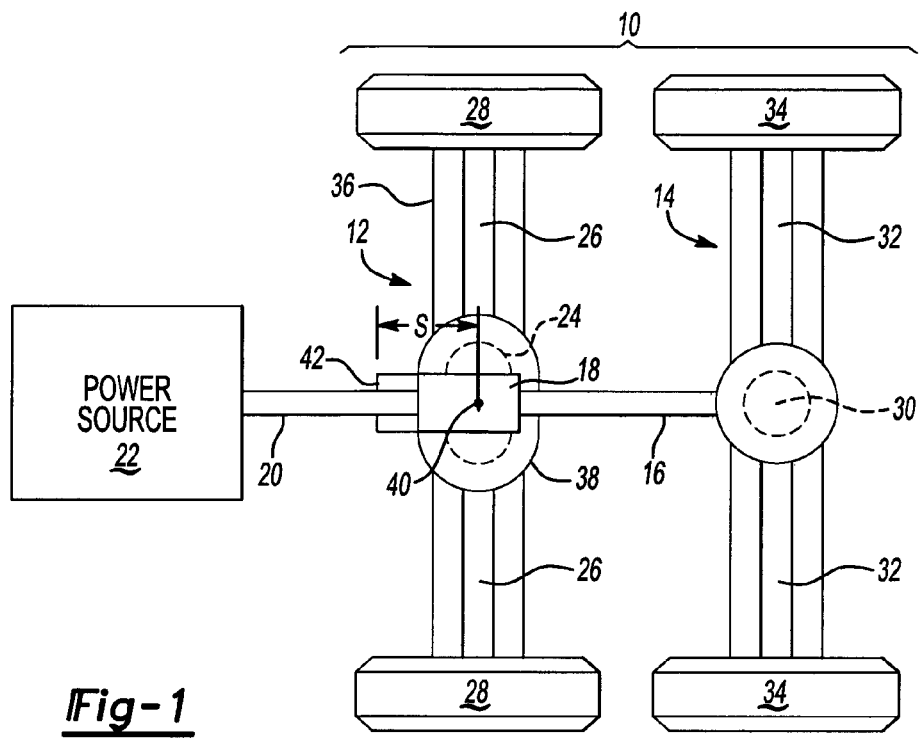
FIG. 1 is a schematic diagram of a powertrain including a tandem drive axle with an inter-axle differential assembly incorporating the subject invention.

A tandem drive axle 10 is shown in FIG. 1. The tandem drive axle 10 includes a forward axle 12 and a rear axle 14 coupled to the forward axle 12 with a connecting driveshaft 16. The forward axle 12 includes an inter-axle differential gear assembly 18 that is coupled to a drive shaft 20, which is driven by a power source 22, such as an engine or electric motor, for example. Additional powertrain components such as a transmission, gearbox, clutch, or any other known powertrain components can be positioned between the power source 22 and the drive shaft 20 as known in the art. The inter-axle differential gear assembly 18 provides speed differentiation between the forward axle 12 and the rear axle 14 as is known.

The forward axle 12 includes a forward differential gear assembly 24 that is coupled to forward axle shafts 26 that drive a pair of laterally opposed forward wheel ends 28. The rear axle 14 includes a rear differential gear assembly 30 that is coupled to rear axle shafts 32 that drive a pair of laterally opposed rear wheel ends 34. The inter-axle differential gear assembly 18 is coupled to drive the forward differential gear assembly 24 and the rear differential gear assembly 30 via the connecting driveshaft 16.

The forward axle 12 includes an axle housing 36 that substantially encloses the forward axle shafts 26, the inter-axle differential gear assembly 18, and the forward differential gear assembly 24. The axle housing 36 includes a bowl portion 38 that receives the inter-axle differential gear assembly 18 and forward differential gear assembly 24. The axle housing 36 defines a vertical centerline 40.

An input yoke assembly 42 couples the drive shaft 20 to the inter-axle differential gear assembly 18. Standout S is defined as the distance from the vertical centerline 40 of the axle housing 36 to an end of the input yoke assembly 42. The subject invention provides a unique inter-axle differential gear assembly 18 that reduces standout S when compared to prior designs. This will be explained in greater detail below.

Figure 2:
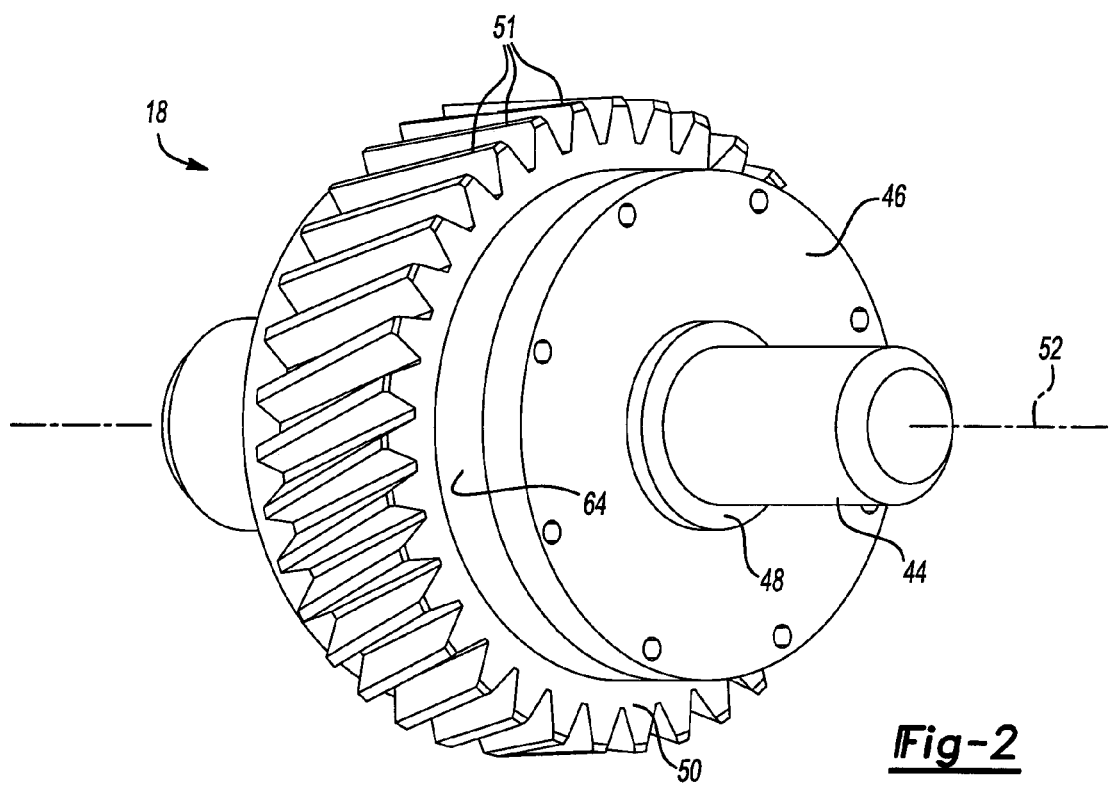
FIG. 2 is a perspective view of an inter-axle differential assembly incorporating the subject invention

As shown in FIG. 2, the inter-axle differential gear assembly 18 includes an input shaft 44 that is coupled to the drive shaft 20 with the input yoke assembly 42. A forward side gear 46 is supported on a bearing 48 on the input shaft 44. A helical drive gear 50 is mounted for rotation with the forward side gear 46 about a longitudinal axis 52 defined by the input shaft 44.

The helical drive gear 50 includes a plurality of gear teeth 51 formed about an outer circumferential surface. The plurality of gear teeth 51 drive a driven gear (not shown) that provides driving input to the forward differential gear assembly 24 as known.

Figure 3:
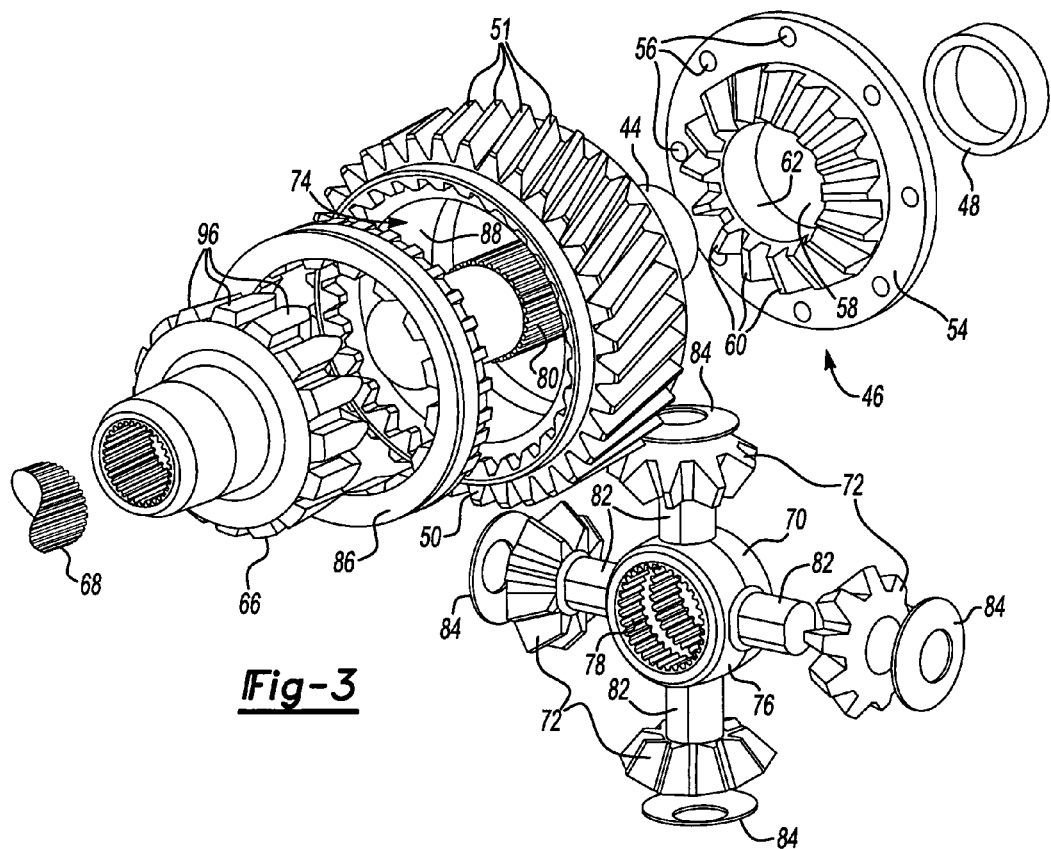
FIG. 3 is an exploded view of the inter-axle differential assembly of FIG. 2.

The forward side gear 46 includes an outer circumferential flange portion 54, shown in FIG. 3, with a plurality of openings 56. A center opening 58 receives the input shaft 44 and bearing 48. The forward side gear 46 includes a plurality of gear teeth 60 formed on a center portion 62, and which are spaced radially inward from the plurality of openings 56. The openings 56 receive fasteners (not shown) to secure the forward side gear 46 to the helical drive gear 50.

The fasteners can be separate fasteners or can be formed as extensions on the helical drive gear 50 that are inserted into the openings 56. Optionally, a reverse mounting configuration could be used with extensions (not shown) formed on the forward side gear 46 and openings (not shown) formed within a flange portion 64 (see FIG. 2) of the helical drive gear 50. Further, corresponding openings (not shown) could be formed on the flange portion 64 of the helical drive gear 50 to align with openings 56 on the forward side gear, with the fasteners being inserted through both sets of openings. Also, it should be understood that the forward side gear 46 and the helical drive gear 50 could be integrally formed together as a single piece to eliminate the need for fasteners.

As shown in FIG. 3, the inter-axle differential gear assembly 18 includes a rear side gear 66 that is operably coupled to a thru-shaft 68, which is coupled to the connecting driveshaft 16 that provides driving input to the rear differential gear assembly 30. A differential spider 70 supports a plurality of inter-axle differential pinion gears 72 that are in meshing engagement with the forward side gear 46 and rear side gear 66. The differential spider 70 and the plurality of inter-axle differential pinion gears 72 are mounted within a center cavity 74 formed within the helical drive gear 50.

The differential spider 70 includes a center body portion 76 with a splined bore 78 that engages a splined portion 80 formed on the input shaft 44. A plurality of legs 82 extends radially outward from the center body portion 76. Preferably, four (4) legs 82 extend outwardly to form a cross-shaped member. One inter-axle differential pinion gear 72 is supported on each leg 82. A thrust washer 84 is positioned adjacent to each inter-axle differential pinion gear 72.

The inter-axle differential gear assembly 18 also includes a locking ring 86. The locking ring 86 is actuated to move between a locked position, where the rear side gear 66 is locked to the helical drive gear 50, and an unlocked position. This will be discussed in greater detail below.

Figure 4:
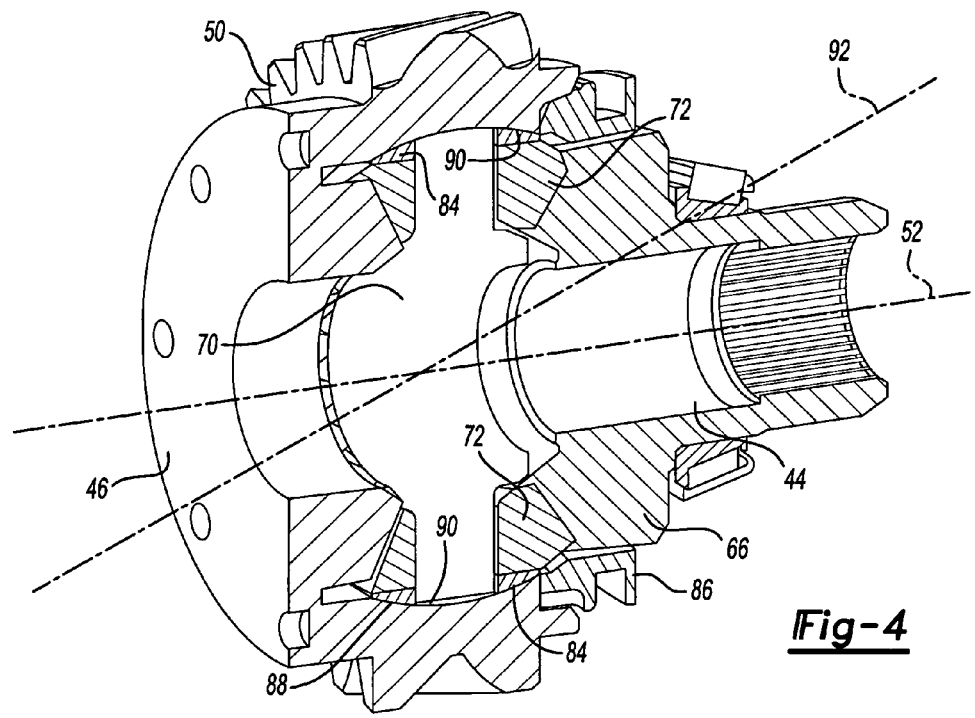
FIG. 4 is a perspective view in partial cross-section of the inter-axle differential assembly of FIG. 2.

As shown in FIGS. 3 and 4, the center cavity 74 of the helical drive gear 50 is defined by a spherical surface. The center cavity 74 includes an inner circumferential surface 88 that extends continuously, three hundred and sixty degrees (360°), circumferentially about the longitudinal axis 52. The inner circumferential surface 88 is also defined by a curved surface 90, shown most clearly in FIGS. 4, 5A, and 5B) that is curved in a direction transverse to an inner circumferential direction defined by an inner circumference of the center cavity 74. The curved surface 90 extends discontinuously, less than three hundred and sixty degrees (360°), circumferentially about a lateral axis 92 that intersects the longitudinal axis 52. Thus, the inner circumferential surface 88 is curved in multiple directions.

Thrust washers 84 are positioned between each inter-axle differential pinion gear 72 and the inner circumferential surface 88. The use of thrust washers 84 helps reduce component wear as known.

As shown in FIG. 4, when the inter-axle differential gear assembly 18 is fully assembled, the differential spider 70 and the plurality of inter-axle differential pinion gears 72 are substantially enclosed within the center cavity 74. The plurality of gear teeth 60 from the forward side gear 46 and a plurality of gear teeth 96 from the rear side gear 66 extend at least partially into the center cavity 74 to meshingly engage the plurality of inter-axle differential pinion gears 72.

The differential spider 70 is driven by the input shaft 44. The rear side gear 66 is driven by the plurality of inter-axle differential pinion gears 72. The inter-axle differential pinion gears 72 are supported on the differential spider 70, which is directly mounted to the input shaft 44 and which can rotate within the center cavity 74 relative to the inner circumferential surface 88. The inter-axle differential pinion gears 72 drive the forward side gear 46. The forward side gear 46 rotates with the helical drive gear 50 to provide input to the forward axle 12. The rear axle 14 receives driving input via the connection of the rear side gear 66 to the thru-shaft 68 and connecting driveshaft 16.

This unique configuration forms a very compact inter-axle differential gear assembly 18 and eliminates the need for an inter-axle differential housing assembly. This provides a significant weight reduction and facilitates assembly when compared to prior designs. Also, because the inter-axle differential gear assembly 18 is more compact, the standout S is significantly reduced when compared to prior configurations. Reducing standout improves driveline angles and reduces component wear.

Figure 5A:
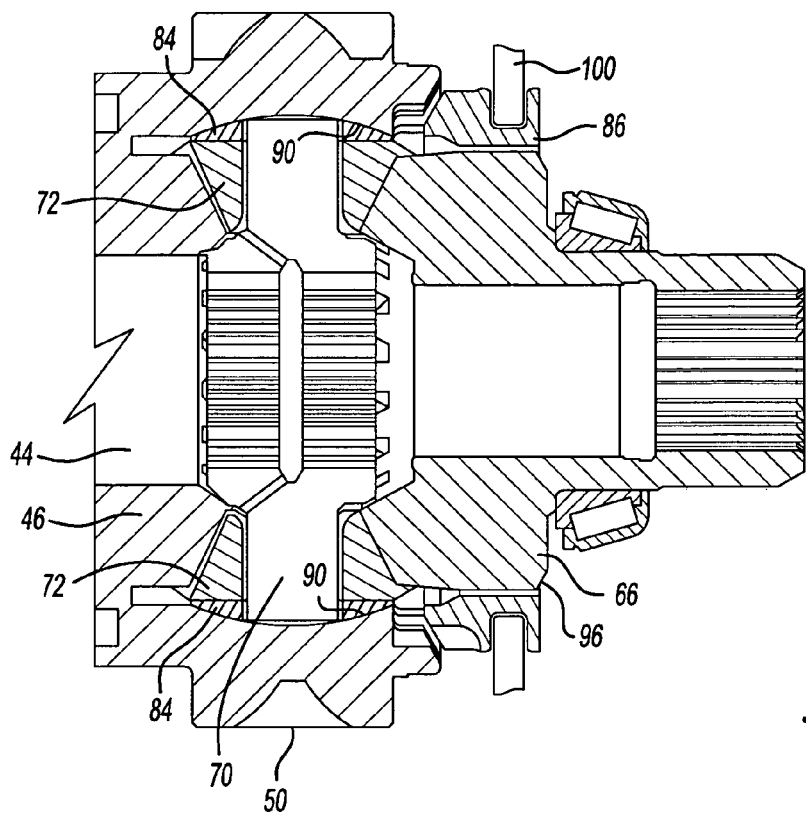
FIG. 5A is a side view in partial cross-section showing the inter-axle differential assembly in an unlocked position.
Figure 5B:
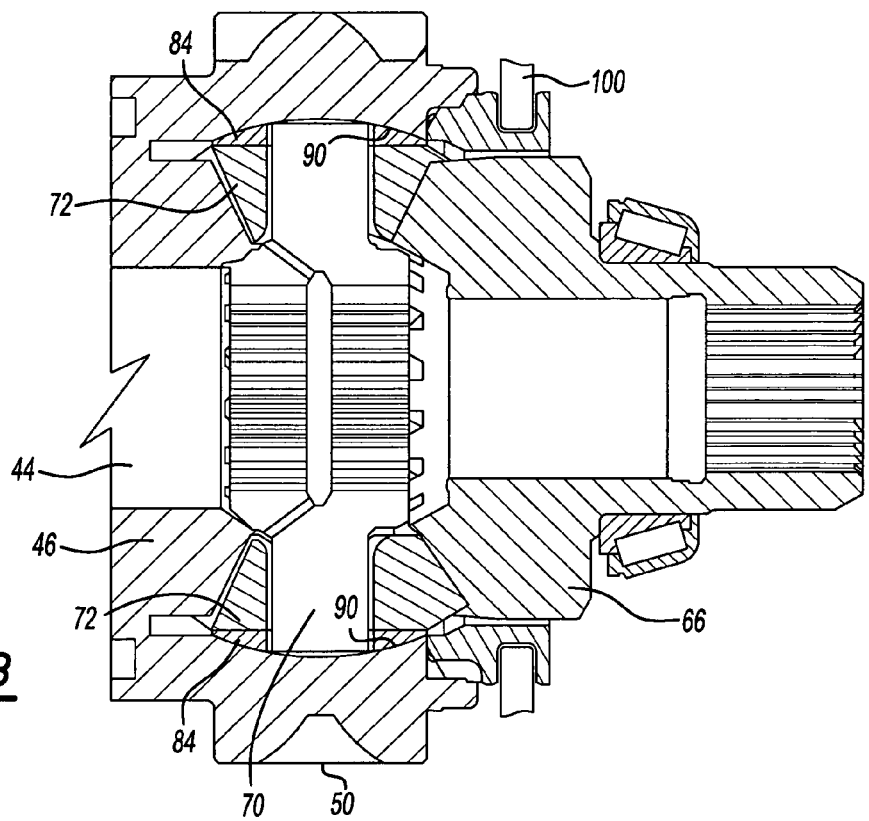
FIG. 5B is a side view in partial cross-section showing the inter-axle differential assembly in a locked position.

As discussed above, the inter-axle differential gear assembly 18 includes a locking ring 86 that is moved between locked and unlocked positions. FIG. 5A shows the inter-axle differential gear assembly 18 in the unlocked position. In this position, the rear side gear 66 and the helical drive gear 50 can rotate at different speeds. A shifting mechanism, shown schematically at 100, is used to move the locking ring 86 into the locked position, shown in FIG. 5B. In this position, the rear side gear 66 and the helical drive gear 50 are locked for rotation together causing the input speed to the forward axle 12 and the rear axle to be substantially the same speed.

Figure 6:
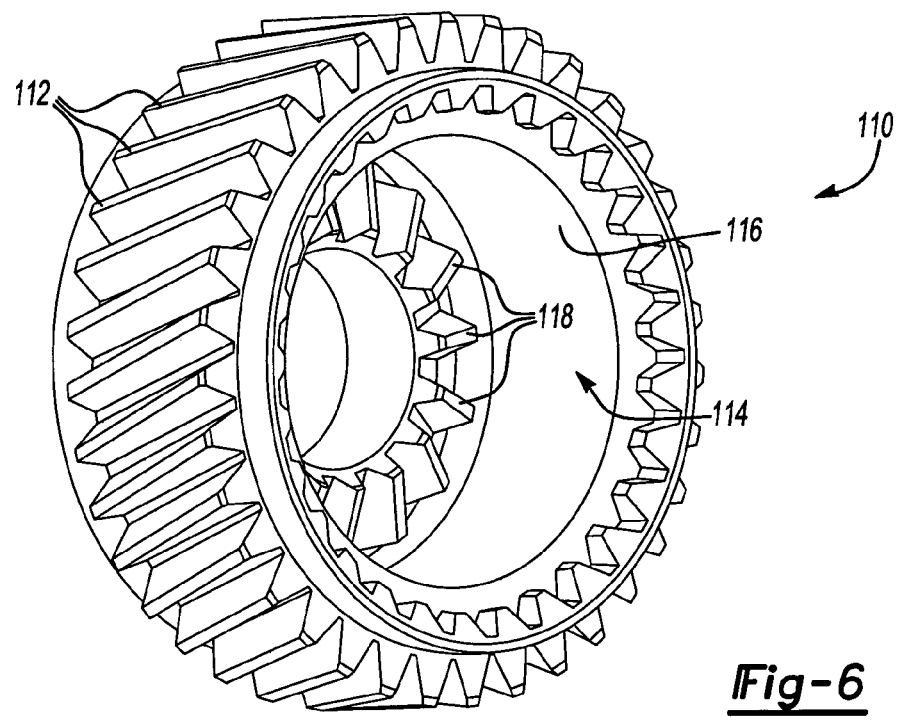
FIG. 6 is a perspective view of a drive gear and forward side gear assembly.

An example embodiment of an integrally formed helical drive gear and forward side gear assembly 110 is shown in FIG. 6. The helical drive gear and forward side gear assembly 110 includes a plurality of helical gear teeth 112 formed about an outer circumference. A center cavity 114 is defined by a spherical surface 116 similar to that described above. A plurality of forward side gear teeth 118 is formed on one side of the center cavity 114. The differential spider 70 and the plurality of inter-axle differential pinion gears 72 are received within the center cavity 114 in a manner similar to that described above. The inter-axle differential pinion gears 72 are in meshing engagement with the plurality of forward side gear teeth 118.

Figure 7:
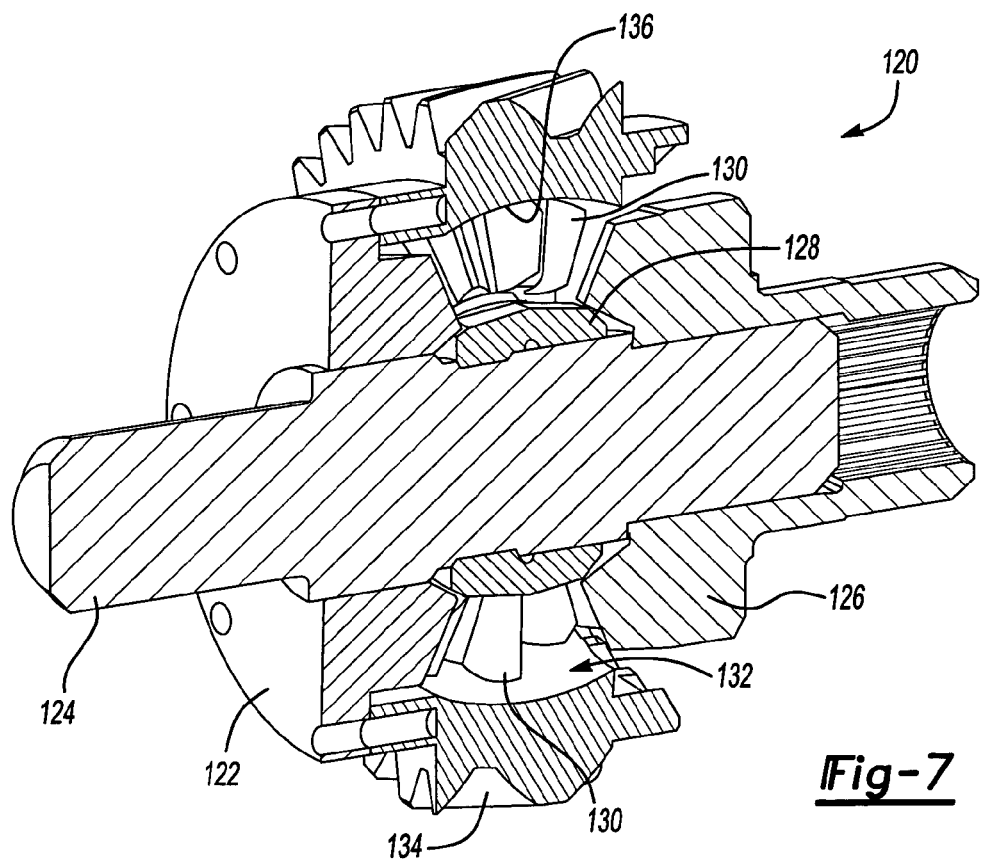
FIG. 7 is a perspective view in partial cross-section showing another example of an inter-axle differential assembly incorporating the subject invention.
Figure 8:
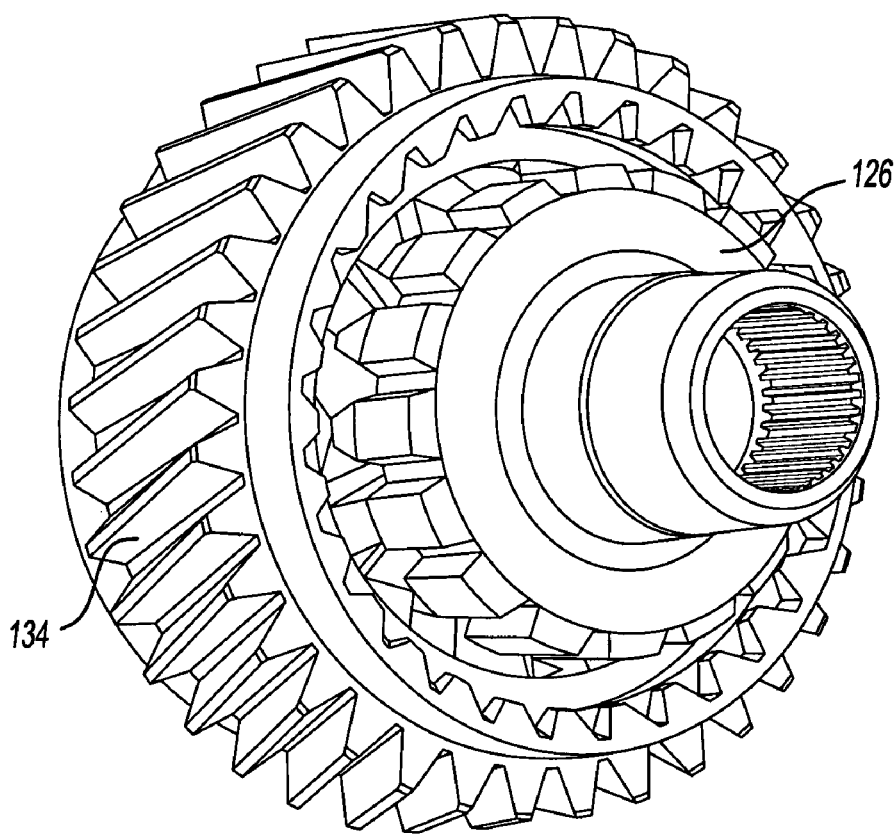
FIG. 8 is a perspective view of the inter-axle differential assembly shown in FIG. 7.

Another example of an inter-axle differential gear assembly 120 is shown in FIGS. 7 and 8. This configuration is similar to the configuration discussed above, but does not include a locking ring and thrust washers. A forward side gear 122 and rear side gear 126 are supported for rotation relative to an input shaft 124. A differential spider 128 and a plurality of inter-axle differential pinion gears 130 are mounted in a center cavity 132 of a helical drive gear 134. The center cavity 132 includes a spherical surface 136. When assembled, the differential spider 128 and the inter-axle differential pinion gears 130 are substantially enclosed within the center cavity 132 to provide a compact assembly.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An inter-axle differential assembly for a drive axle comprising:
    a rear side gear supported by an input shaft;
    a plurality of inter-axle differential pinion gears in meshing engagement with said rear side gear;
    a forward side gear in meshing engagement with said plurality of inter-axle differential pinion gears; and
    a drive gear fixedly mounted to said forward side gear for rotation with said forward side gear, said drive gear including a hollow center cavity, wherein said plurality of inter-axle differential pinion gears are positioned within said hollow center cavity.

2. The inter-axle differential assembly according to claim 1 wherein said drive gear includes an outer circumferential surface and an inner circumferential surface, said outer circumferential surface including a plurality of gear teeth and said inner circumferential surface defining said hollow center cavity.

3. The inter-axle differential assembly according to claim 2 including a spider having a plurality of legs with each leg supporting one of said plurality of inter-axle differential pinion gears and wherein said spider is positioned within said hollow center cavity.

4. The inter-axle differential assembly according to claim 2 including a forward differential gear assembly driven by said drive gear and a thru-shaft coupled to said rear side gear to drive a rear differential gear assembly.

5. inter-axle differential assembly according to claim 2 wherein said inner circumferential surface is defined by a spherical radius.

6. The inter-axle differential assembly according to claim 2 wherein said drive gear rotates about a longitudinal axis with said inner circumferential surface being defined by a first radial surface continuously extending 360 degrees about said longitudinal axis and wherein said inner circumferential surface is further defined by a second radial surface discontinuously extending about a lateral axis that intersects said longitudinal axis.

7. The inter-axle differential assembly according to claim 2 wherein said drive gear is a helical gear and said forward and rear side gears are bevel gears.

8. The inter-axle differential assembly according to claim 1 wherein said drive gear is adapted to drive a driven gear to provide driving input to a forward differential assembly of a forward drive axle.

9. The inter-axle differential assembly according to claim 8 including a thru-shaft coupled to said rear side gear, said thru-shaft adapted to provide driving output to a rear differential assembly of a rear drive axle.

10. A tandem drive axle assembly comprising:
    a forward drive axle including a forward differential assembly;
    a pair of forward axle shafts driven by said forward differential assembly to rotate a forward pair of laterally opposed wheel ends;
    a rear drive axle coupled to said forward drive axle by a connecting driveshaft, said rear drive axle including a rear differential assembly operably coupled to said connecting driveshaft;
    a pair of rear axle shafts driven by said rear differential assembly to rotate a rear pair of laterally opposed wheel ends; and
    an inter-axle differential assembly having an input shaft, a rear side gear supported by said input shaft, a plurality of inter-axle differential pinion gears in meshing engagement with said rear side gear, a spider including a plurality of legs with each leg supporting one of said plurality of inter-axle differential pinion gears, a forward side gear in meshing engagement with said plurality of inter-axle differential pinion gears, and a helical drive gear fixedly mounted to said forward side gear for rotation with said forward side gear and including a center cavity for receiving said spider and said plurality of inter-axle differential pinion gears wherein said helical drive gear provides driving input into said forward differential assembly.

11. The tandem drive axle assembly according to claim 10 including a thru-shaft coupled to said rear side gear and coupled to said connecting driveshaft, and wherein said pairs of forward and rear axle shafts generally extend in a lateral direction with said input shaft, said thru-shaft and said connecting driveshaft all generally extending in a longitudinal direction.

12. The tandem drive axle assembly according to claim 10 wherein said helical drive gear includes an outer circumferential surface and an inner circumferential surface, said outer circumferential surface including a plurality of gear teeth and said inner circumferential surface defining said center cavity.

13. The tandem drive axle assembly according to claim 12 wherein said inner circumferential surface is a spherical surface.

14. The tandem drive axle assembly according to claim 13 wherein said spider and said plurality of inter-axle differential pinion gears are substantially enclosed within said center cavity.

15. An inter-axle differential assembly for a drive axle comprising:
   a rear side gear supported by an input shaft;
   a plurality of inter-axle differential pinion gears in meshing engagement with said rear side gear;
   a forward side gear in meshing engagement with said plurality of inter-axle differential pinion gears;
   a drive gear mounted for rotation with said forward side gear, said drive gear including a hollow center cavity, wherein said plurality of inter-axle differential pinion gears are positioned within said hollow center cavity, and wherein said drive gear includes an outer circumferential surface and an inner circumferential surface, said outer circumferential surface including a plurality of gear teeth and said inner circumferential surface defining said hollow center cavity; and
   a spider having a plurality of legs with each leg supporting one of said plurality of inter-axle differential pinion gears and wherein said spider is positioned within said hollow center cavity, and wherein said spider is driven by said input shaft and includes a plurality of thrust washers with each of said plurality of thrust washers being supported by one of said plurality of legs, each of said thrust washers being positioned between one of said plurality of inter-axle differential pinion gears and said inner circumferential surface.

16. An inter-axle differential assembly for a drive axle comprising:
   a rear side gear supported by an input shaft;
   a plurality of inter-axle differential pinion gears in meshing engagement with said rear side gear;
   a forward side gear in meshing engagement with said plurality of inter-axle differential pinion gears;
   a drive gear mounted for rotation with said forward side gear, said drive gear including a hollow center cavity, wherein said plurality of inter-axle differential pinion gears are positioned within said hollow center cavity, and wherein said drive gear includes an outer circumferential surface and an inner circumferential surface, said outer circumferential surface including a plurality of gear teeth and said inner circumferential surface defining said hollow center cavity; and
   a locking mechanism selectively movable between an unlock position and a lock position, said rear side gear being fixed for rotation with said drive gear at said lock position.

17. A tandem drive axle assembly comprising:
   a forward drive axle including a forward differential assembly;
   a pair of forward axle shafts driven by said forward differential assembly to rotate a forward pair of laterally opposed wheel ends;
   a rear drive axle coupled to said forward drive axle by a connecting driveshaft, said rear drive axle including a rear differential assembly operably coupled to said connecting driveshaft;
   a pair of rear axle shafts driven by said rear differential assembly to rotate a rear pair of laterally opposed wheel ends; and
   an inter-axle differential assembly having an input shaft, a rear side gear supported by said input shaft, a plurality of inter-axle differential pinion gears in meshing engagement with said rear side gear, a spider including a plurality of legs with each leg supporting one of said plurality of inter-axle differential pinion gears, a forward side gear in meshing engagement with said plurality of inter-axle differential pinion gears, and a helical drive gear mounted for rotation with said forward side gear and including a center cavity for receiving said spider and said plurality of inter-axle differential pinion gears wherein said helical drive gear provides driving input into said forward differential assembly, and wherein said helical drive gear includes an outer circumferential surface and an inner circumferential surface, said outer circumferential surface including a plurality of gear teeth and said inner circumferential surface comprising a spherical surface that defines said center cavity with said spider and said plurality of inter-axle differential pinion gears being substantially enclosed within said center cavity, and wherein said spider is directly driven by said input shaft.

18. An inter-axle differential assembly for a drive axle comprising:
   a forward side gear supported by an input shaft;
   a plurality of inter-axle differential pinion gears in meshing engagement with said forward side gear;
   a rear side gear in meshing engagement with said plurality of inter-axle differential pinion gears;
   a thru-shaft coupled to said rear side gear wherein said thru-shaft provides driving input to a rear differential assembly via a connecting driveshaft; and
   a drive gear fixedly mounted to said forward side gear for rotation with said forward side gear, said drive gear including a plurality of drive gear teeth for driving a driven gear of a forward differential assembly, and said drive gear including a hollow center cavity wherein said plurality of inter-axle differential pinion gears are positioned within said hollow center cavity.

19. The inter-axle differential assembly according to claim 18 wherein said drive gear includes a gear body with said plurality of drive gear teeth integrally formed with said gear body as a single piece component, and wherein said gear body defines said hollow center cavity.

20. The inter-axle differential assembly according to claim 18 wherein said input shaft defines a longitudinal axis extending along a vehicle length, and wherein said forward and rear side gears rotate about said longitudinal axis.

* * * * *

UNITED STATES PATENT AND TRADEMARK OFFICE
CERTIFICATE OF CORRECTION

PATENT NO. : 7,291,083 B2
APPLICATION NO. : 10/911011
DATED : November 6, 2007
INVENTOR(S) : Almaguer It is certified that error appears in the above-identified patent and that said Letters Patent is hereby corrected as shown below:

Claim 5, Column 6, line 15: Insert --The-- before "inter-axle"

Signed and Sealed this

Sixth Day of May, 2008

JON W. DUDAS
*Director of the United States Patent and Trademark Office*